United States Patent
Masui et al.

(10) Patent No.: US 11,006,023 B2
(45) Date of Patent: May 11, 2021

(54) CAMERA APPARATUS FOR VEHICLE AND MANUFACTURING METHOD FOR CAMERA APPARATUS FOR VEHICLE

(71) Applicant: DENSO CORPORATION, Kariya (JP)

(72) Inventors: Soji Masui, Kariya (JP); Sho Okuda, Kariya (JP); Daisuke Takama, Kariya (JP); Yasuki Furutake, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/021,819

(22) Filed: Jun. 28, 2018

(65) Prior Publication Data

US 2019/0007587 A1 Jan. 3, 2019

(30) Foreign Application Priority Data

Jun. 30, 2017 (JP) .............................. JP2017-129689

(51) Int. Cl.
*H04N 5/225* (2006.01)
*B60R 11/04* (2006.01)

(52) U.S. Cl.
CPC .......... *H04N 5/2252* (2013.01); *B60R 11/04* (2013.01); *H04N 5/2253* (2013.01); *H04N 5/2254* (2013.01); *H04N 5/2257* (2013.01); B60R 2300/10 (2013.01)

(58) Field of Classification Search
CPC .. H04N 5/2252; H04N 5/2257; H04N 5/2254; H04N 5/2253; B60R 11/04; B60R 2300/10
See application file for complete search history.

(56) References Cited

U.S. PATENT DOCUMENTS

| | | | |
|---|---|---|---|
| 7,965,336 B2* | 6/2011 | Bingle | H04N 5/374 348/374 |
| 9,338,334 B2 | 5/2016 | Lu et al. | |
| 10,506,141 B2* | 12/2019 | Sigle | H04N 5/2253 |
| 2014/0022657 A1 | 1/2014 | Lu et al. | |
| 2014/0160284 A1* | 6/2014 | Achenbach | H04N 5/2251 348/143 |
| 2014/0313337 A1 | 10/2014 | Devota et al. | |
| 2016/0274326 A1 | 9/2016 | Kimura | |
| 2016/0318457 A1 | 11/2016 | Nakano et al. | |
| 2016/0318458 A1 | 11/2016 | Wato et al. | |
| 2017/0126938 A1* | 5/2017 | Newiger | H04N 5/2257 |

FOREIGN PATENT DOCUMENTS

| | | |
|---|---|---|
| JP | H11-327016 A | 11/1999 |
| JP | 2001-197337 A | 7/2001 |
| JP | 2006-308987 A | 11/2006 |
| JP | 2015-014648 A | 1/2015 |
| JP | 2016-203952 A | 12/2016 |
| JP | 2016-208466 A | 12/2016 |

* cited by examiner

*Primary Examiner* — Padma Haliyur
(74) *Attorney, Agent, or Firm* — Maschoff Brennan (57) ABSTRACT

A camera apparatus is mounted to a vehicle. The camera apparatus includes a camera module, a casing, and a restraining portion. The camera module includes a lens and a camera board on which an image sensor is provided. The casing houses the camera module. The restraining portion is configured to mechanically restrain movement of the camera module that is mounted in a predetermined mounting position within the casing, from the mounting position. The camera module is fixed to the casing by an adhesive.

17 Claims, 8 Drawing Sheets

CAMERA APPARATUS FOR VEHICLE AND MANUFACTURING METHOD FOR CAMERA APPARATUS FOR VEHICLE

CROSS-REFERENCE TO RELATED APPLICATION

This application is based on and claims the benefit of priority from Japanese Patent Application No. 2017-129689, filed Jun. 30, 2017. The entire disclosure of the above application is incorporated herein by reference.

BACKGROUND

Technical Field

The present disclosure relates to a camera apparatus and a manufacturing method for the camera apparatus.

Related Art

US Patent Application Publication No. 2014/0313337 discloses a camera apparatus that is mounted to a vehicle. The camera apparatus includes a camera module and a casing. The camera module includes a lens and a camera board on which an image sensor is provided. The casing houses the camera module. The camera module has a clip in which a hole is formed. A screw is able to pass through the hole. The camera module is fixed to the casing by the screw being passed through the clip and screwed into a screw hole on the casing side.

In the configuration described in US Patent Application Publication No. 2014/0313337, the camera module is provided with the clip. Therefore, the casing that houses the camera module, that is, the camera apparatus increases in size by an amount equivalent to the clip. In terms of reducing the size of the camera apparatus, fixing the camera module to the casing through use of an adhesive, for example, instead of the clip can be considered.

However, when the camera module is fixed using an adhesive, to ensure that the camera module is fixed in a state in which an optical axis of the lens in the camera module is facing a correct direction, the camera module is required to be held by a dedicated jig or the like until the adhesive hardens. To shorten the amount of time over which the camera module is held, use of a special adhesive, such as an ultraviolet (UV) curable resin, can be considered.

In such a method, it can be said that there is little degree of freedom in the manufacturing process of the camera apparatus because the dedicated jig or the like is required to be used and the types of adhesive are limited.

SUMMARY

It is thus desired to provide a technology for improving the degree of freedom in a manufacturing process for a camera apparatus.

A first exemplary embodiment of the present disclosure provides a camera apparatus that is mounted to a vehicle. The camera apparatus includes a camera module, a casing, and a restraining portion. The camera module includes a lens and a camera board on which an image sensor is provided. The casing houses the camera module. The restraining portion is configured to mechanically restrain movement of the camera module that is mounted in a predetermined mounting position within the casing, from the mounting position.

As a result of such a configuration, the movement of the camera module from the mounting position is mechanically restrained when the camera module is mounted to the casing. Therefore, when the camera module is fixed to the casing, the camera module is not necessarily required to be held using a dedicated jig or the like until an adhesive hardens. In addition, limitations on the type of adhesive and the like are relaxed. Therefore, the degree of freedom in the manufacturing process of the camera apparatus can be improved.

A second exemplary embodiment of the present disclosure is a manufacturing method for a camera apparatus. The manufacturing method includes mounting a camera module in a predetermined mounting position within a casing. The manufacturing method includes restraining movement of the camera module away from the mounting position by a restraining portion that is provided in the camera apparatus and mechanically restrains movement of the camera module from the mounting position. The manufacturing method includes applying an adhesive between the casing and the camera module. The manufacturing method includes fixing the camera module to the casing by the adhesive being hardened.

As a result of such a configuration, effects similar to those of the above-described camera apparatus can be achieved.

DESCRIPTION OF THE EMBODIMENTS

Embodiments for carrying out the present disclosure will hereinafter be described with reference to the drawings.

1. First Embodiment

[1-1. Configuration]

A camera apparatus 1 shown in FIG. 1 to FIG. 5 is set on an inner side of a windshield of a vehicle. The camera apparatus 1 is an onboard camera that captures images of an area ahead of the vehicle. The camera apparatus 1 includes a camera module 11, a control board 12, a casing (housing) 13, and a lower-portion cover 14.

Figure 1:
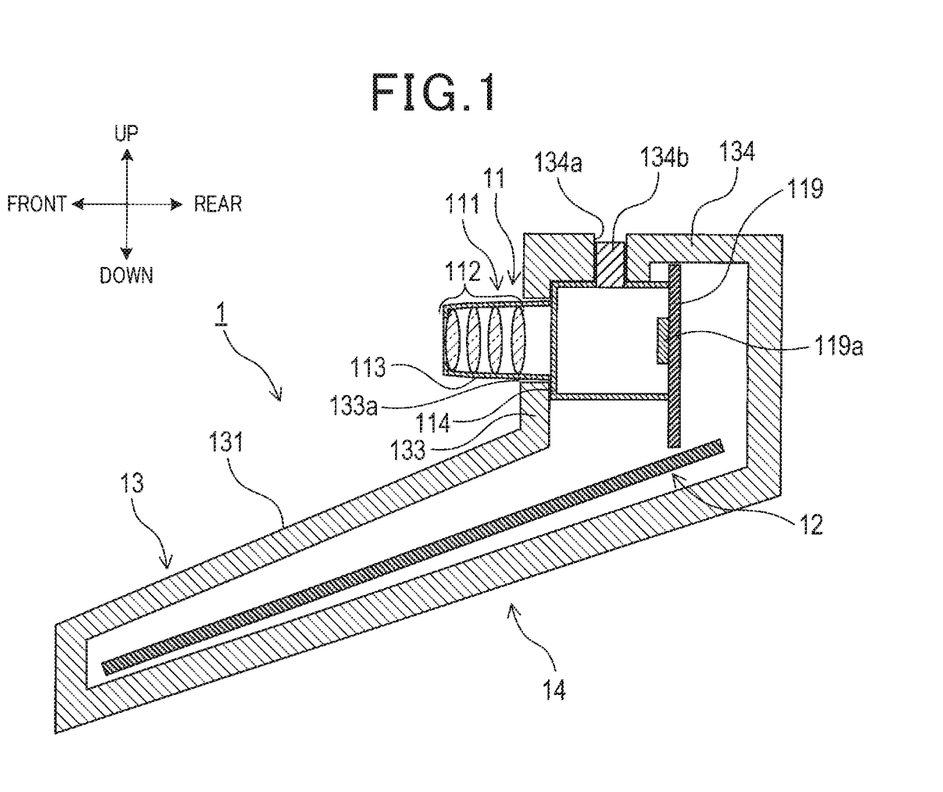
FIG. 1 is a cross-sectional view of a camera apparatus according to a first embodiment.
Figure 3:
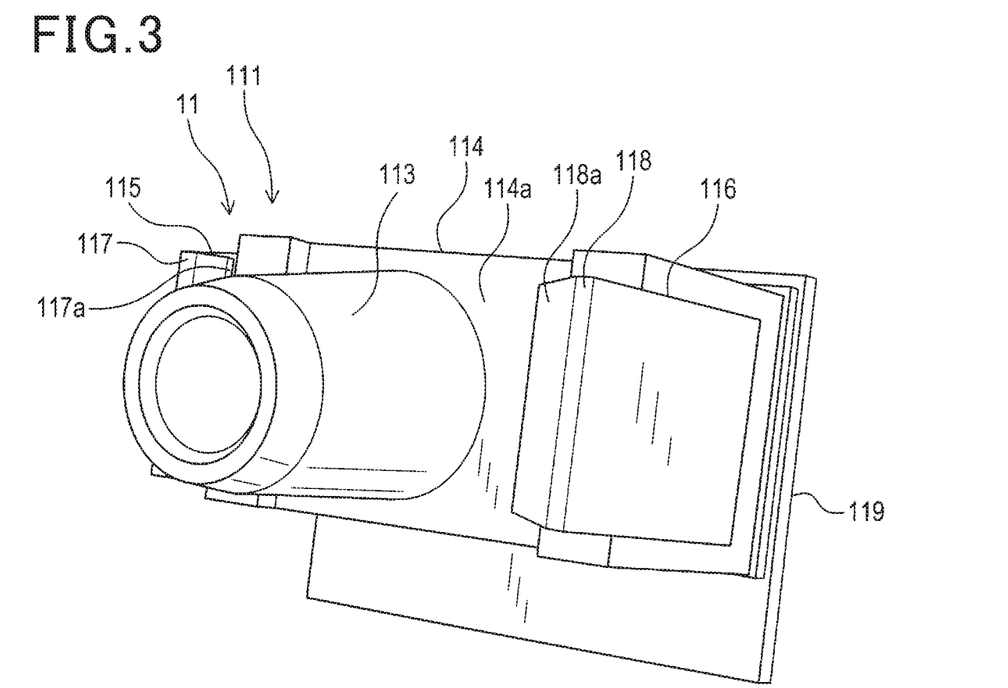
FIG. 3 is a perspective view of a camera module according to the first embodiment, viewed from a front-right direction.

The camera module 11 includes an optical unit 111 and a camera board 119. The optical unit 111 includes a plurality of lenses 112 (four lenses in this example), a lens barrel portion 113, a base portion 114, and engaging protruding portions 115 and 116.

The lens barrel portion 113 and the base portion 114 are integrally molded with resin. The lens barrel portion 113 holds the lenses 112 therein. The lenses 113 are aligned in an optical-axis direction, such that optical axes thereof coincide with a center axis of the lens barrel portion 113. In addition, the lens barrel portion 113 is formed such that a diameter thereof decreases away from the base portion 114. The base portion 114 is in the shape of a rectangular parallelepiped that widens in a direction perpendicular to the optical axis and is open at the rear.

Specifically, as shown in FIG. 3, the base portion 114 includes a front surface 114a and four plate-shaped side surfaces. The lens barrel portion 113 is mounted vertically on the front surface 114a. The four side surfaces are upper, lower, left, and right surfaces that stand from the front surface 114a. According to the present embodiment, left and right edge portions of the front surface 114a protrude frontward.

Here, as described hereafter, the camera module 11 is housed in the casing 13 such that the lens barrel portion 113 is exposed outside of the casing 13. Frontward and rearward directions are defined herein in a following manner. That is, a direction in which the lens barrel portion 113 is exposed from the casing 13 is the frontward direction. A direction opposite the frontward direction is the rearward direction. In addition, leftward and rightward directions are defined as the leftward and rightward directions when the camera apparatus 1 is viewed from the frontward direction. The frontward, rearward, leftward, rightward, upward, and downward directions are indicated by arrows in FIG. 1, FIG. 2, FIG. 4, and FIG. 5.

Figure 2:
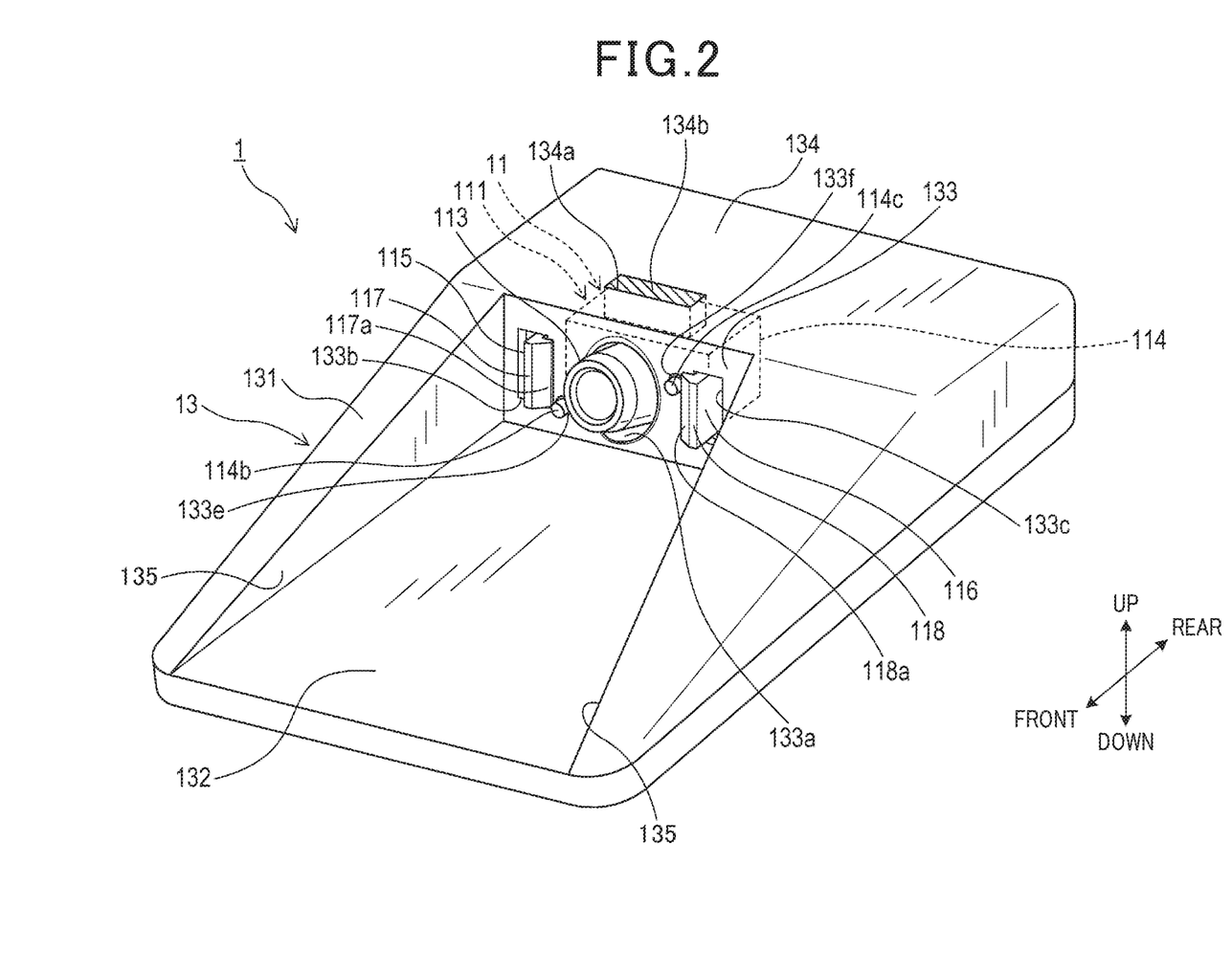
FIG. 2 is a perspective view of the camera apparatus according to the first embodiment, viewed from an upper front-right direction.
Figure 4:
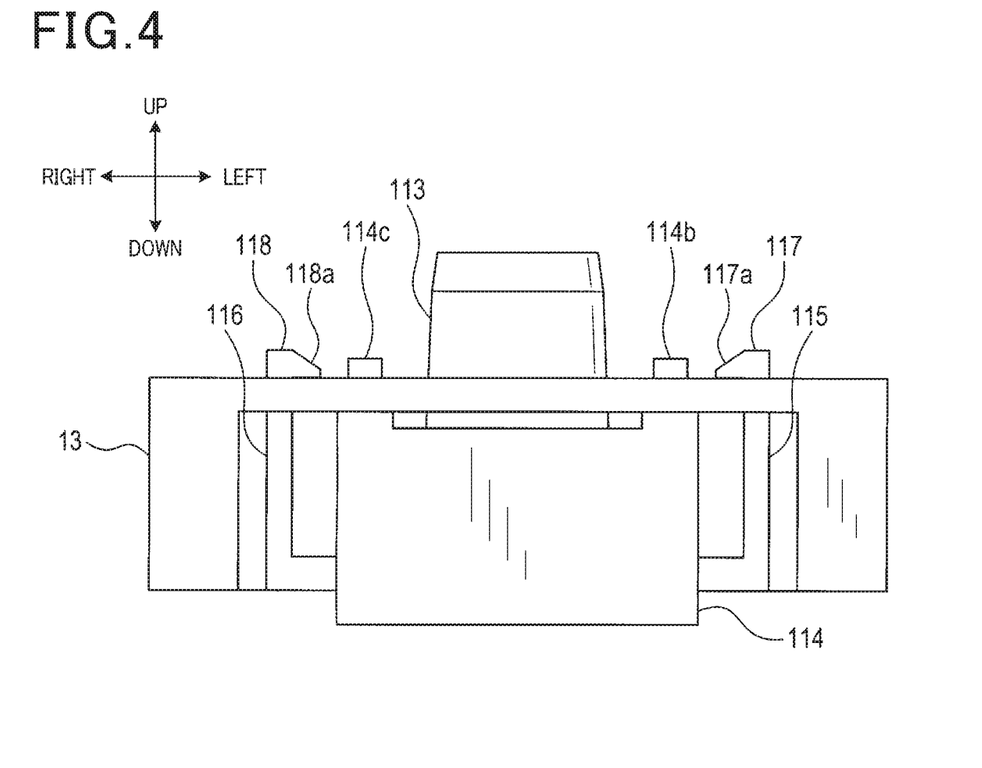
FIG. 4 is an explanatory diagram of a structure of a restraining portion according to the first embodiment.

As shown in FIG. 2, FIG. 4, and the like, the base portion 114 has a plurality of circular columnar protrusions 114b and 114c (two protrusions in this example) on the front surface 114a. According to the present embodiment, the protrusions 114b and 114c are respectively provided on the left and right edge portions that protrude from the front surface 114a. As described hereafter, the protrusions 114b and 114c function as a guide portion that guides the camera module 11 to a predetermined mounting position within the casing 13, in a state in which the optical-axis direction of the lenses 112 relative to the casing 113 is held in a predetermined orientation.

The protrusions 114b and 114c are provided in symmetrical positions with the lens barrel portion 113 therebetween, when the camera module 11 is viewed from the optical-axis direction of the lenses 112. According to the present embodiment, one protrusion 114b is provided below the other protrusion 114c. Specifically, when the camera module 11 is viewed so as to oppose the front surface of the camera module 11, the protrusion 114b is provided to the lower left of the lens barrel portion 113. The protrusion 114c is provided to the upper right of the lens barrel portion 113.

Meanwhile, the engaging protruding portions 115 and 116 are elastically deformable protruding portions that are provided on an outer surface of the camera module 11. The engaging protruding portion 115 is provided on a left-side surface of the base portion 114. The engaging protruding portion 116 is provided on a right-side surface of the base portion 114.

According to the present embodiment, the engaging protruding portions 115 and 116 and the base portion 114 are integrally molded with resin. The engaging protruding portions 115 and 116 are provided to enable the camera module 11 to be mounted in the mounting position within the casing 13 by snap-fitting. The mounting position of the camera module 11 within the casing 13 herein refers to a position of the camera module 11 within the casing 13 shown in FIG. 1, FIG. 2, FIG. 4, and FIG. 5. The engaging protruding portions 115 and 116 are inserted into first through holes 133b and 133c, described hereafter, in the casing 13, from the inner side of the casing 13. As a result, movement of the camera module 11 in an arbitrary direction from the mounting position is mechanically restrained.

"Mechanically restrained" herein refers to movement of the camera module 11 in an arbitrary direction from the mounting position being restrained when the camera module 11 is mounted in the mounting position, by at least either of contact between the camera module 11 and the casing 13 and contact between another component provided in the camera apparatus 1 and the camera module 11, and the casing 13. "Contact" herein includes any type of direct or indirect contact through engaging, fitting, screwing together, and other modes of direct or indirect contact.

For example, as a configuration in which contact between another component and the camera module 11, and the casing 13 is used, a structure or a mechanism in which movement of the camera module is restrained by screwing using a separate component, described according to a third embodiment, can be given. In addition, structures or mechanisms for "mechanically restraining" include not only structures or mechanisms in which movable components such as snap fitting components are used, but also structures or mechanisms in which movable components are not used.

The two engaging protruding portions 115 and 116 have the same size and shape. The engaging protruding portions 115 and 116 are formed so as to protrude from positions further towards the rear than the center on the left and right side surfaces of the base portion 114.

The engaging protruding portions 115 and 116 protrude in a protruding direction of the lens barrel portion 113, that is, frontward from the camera module 11. Specifically, the engaging protruding portions 115 and 116 protrude perpendicularly from the left and right side surfaces of the base portion 114. Then, the engaging protruding portions 115 and 116 bend approximately perpendicularly towards the front side of the camera module 11, and extend along the protruding direction of the lens barrel portion 113. That is, as shown in FIG. 4, the engaging protruding portions 115 and 116 are L-shaped from a plan view. In addition, hook portions 117 and 118 are respectively formed in the tip end portions of the engaging protruding portions 115 and 116. Contact surfaces 117a and 118a are respectively formed on the front surfaces of the hook portions 117 and 118. As described hereafter, when the engaging protruding portions 115 and 116 are inserted into the first through holes 133b and 133c, the contact surfaces 117a and 118a come into contact with the wall surfaces of the first through holes 133b and 133c.

Figure 5:
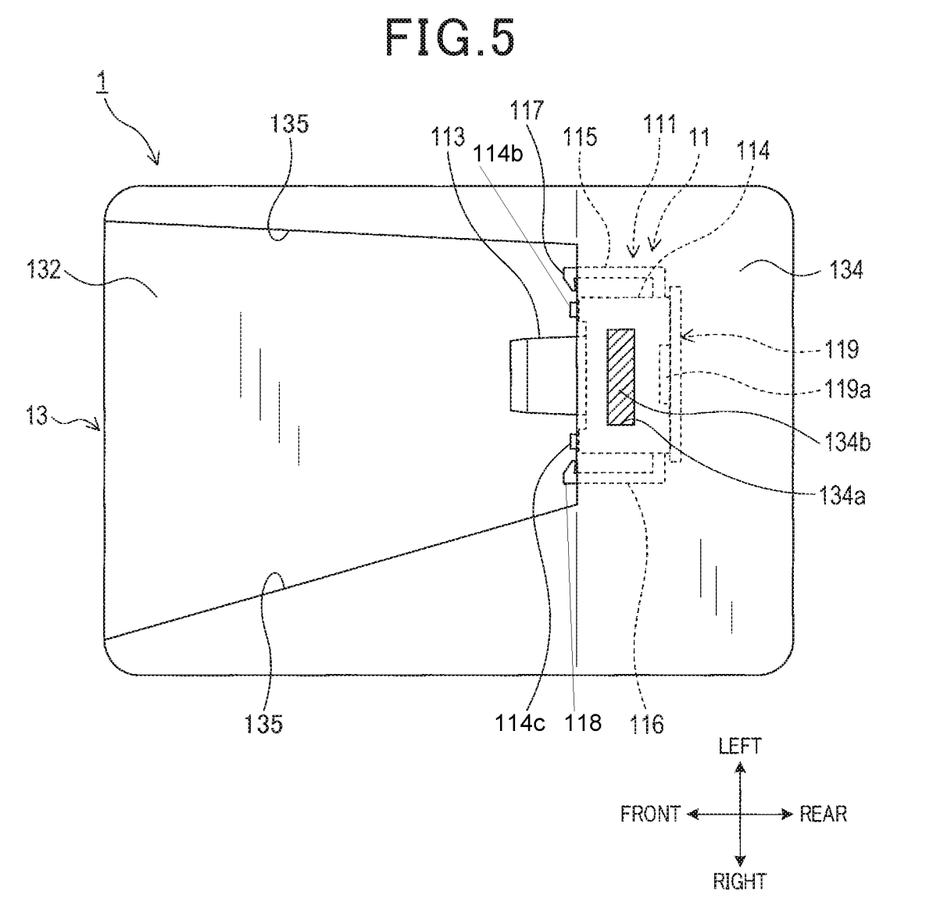
FIG. 5 is a plan view of the camera apparatus according to the first embodiment.

The camera board 119 is a plate-shaped member on which an image sensor 119a, shown in FIG. 1 and FIG. 5, is mounted. The camera board 119 is fixed to the open end portion of the base portion 114. According to the present embodiment, the camera board 119 is fixed to the base portion 114 by an adhesive. The image sensor 119a is a semiconductor image sensor element, such as a charge-coupled device (CCD) image sensor or a complementary metal-oxide semiconductor (CMOS) image sensor. The image sensor 119a captures a subject image that is formed on a light-receiving surface by the lenses 112. The image sensor 119a then outputs an image signal to the control board 12.

The control board 12 shown in FIG. 1 is electrically connected to the camera board 119 by electrical connection wiring (such as a flexible printed board; not shown). The control board 12 performs a recognition process based on the captured image captured by the camera module 11. In the recognition process, the control board 12 recognizes a state ahead of the vehicle. In addition, the control board 12 performs a vehicle control process based on the results of the recognition process. In the vehicle control process, the substrate board 12 controls apparatuses mounted to the vehicle. According to the present embodiment, the control board 12 and the camera board 119 are arranged so as to be separated from each other. However, the control board 12 and the camera board 119 may be integrated.

The casing 13 is a box-like member that is composed of a resin or a metal. The casing 13 is shaped such that the thickness thereof decreases towards the front side. The casing 13 houses the camera module 11 and the control board 12.

As shown in FIG. 2, an upper wall 131 that forms an upper surface of the casing 13 has a planar wall portion 132, a perpendicular wall portion (erected wall portion) 133, and a ceiling wall portion 134.

The planar wall portion 132 is a wall portion in which the upper surface of the planar wall portion 132 spreads in the frontward, rearward, leftward, and rightward directions. The perpendicular wall portion 133 is a wall portion that is mounted vertically (erected) upwards in a rear-side end portion of the planar wall portion 132. The ceiling wall portion 134 is a wall portion that spreads in the rearward direction in an upper-side end portion of the perpendicular wall portion 133. The planar shape of the planar wall portion 132 is a trapezoid. Side wall portions 135 are formed in an upward direction on both left and right sides of the planar wall portion 132. A trapezoidal recess is formed by the planar wall portion 132, the perpendicular wall portion 133, and the side wall portions 135.

In a state in which the camera module 11 is positioned in the mounting position within the casing 13, the ceiling wall portion 134 is positioned above the camera module 11. In the same state, the perpendicular wall portion 113 is positioned so as to oppose the front surface 114a of the base portion 114 of the camera module 11. According to the present embodiment, as shown in FIG. 1 and FIG. 2, in the state in which the camera module 11 is positioned in the mounting position, the upper surface of the camera module 11 is in contact with the undersurface of the ceiling wall portion 134. The front surface 114a of the base portion 114 of the camera module 11 is in contact with the surface on the rear side of the perpendicular wall portion 133.

An exposure hole 133a is formed in a center portion in the leftward/rightward direction and the upward/downward direction of the perpendicular wall portion 133. The lens barrel portion 113 of the camera module 11 is exposed from the exposure hole 133a. In addition, the two first through holes 133b and 133c and two second through holes 133e and 133f are formed in the perpendicular wall portion 133. The through holes 133b, 133c, 133e, and 133f are formed so as to pass through the perpendicular wall portion 133 in the frontward/rearward direction.

The first through holes 133b and 133c are holes that are provided to enable the camera module 11 to be mounted to the casing 13 by snap-fitting. Specifically, the engaging protruding portions 115 and 116 provided in the camera module 11 are inserted into the first through holes 133b and 133c. The first through holes 133b and 133c are longitudinally elongated through holes and have the same shape. The first through holes 133b and 133c are formed in the center portion in the upward/downward direction of the perpendicular wall portion 133. In addition, the first through holes 133b and 133c are formed so as to be symmetrical about a center line in the leftward/rightward direction of the perpendicular wall portion 133.

Meanwhile, the second through holes 133e and 133f are provided to guide the camera module 11 to the mounting position within the casing 13 in a state in which the optical-axis direction of the lenses 112 with respect to the casing 13 is held in the predetermined direction. That is, the protrusions 114b and 114c on the camera module 11 are inserted into the second through holes 133e and 133f. The second through holes 133e and 133f are provided in positions that correspond to the positions of the protrusions 114b and 114c on the camera module 11 in a state in which the camera module 11 is mounted to the casing 13.

Specifically, the second through holes 133e and 133f are provided in symmetrical positions with the exposure hole 133a therebetween. In addition, one second through hole 133e is provided below the other second through hole 133f. Specifically, the second through hole 133e is provided to the lower left of the exposure hole 133a and the second through hole 133f is provided to the upper right of the exposure hole 133a, when the perpendicular wall portion 133 is viewed so as to opposed the front surface of the perpendicular wall portion 133.

Meanwhile, the ceiling wall portion 134 has an adhesive receiving portion 134a. The adhesive receiving portion 134a is a through hole that is formed in the ceiling wall portion 134. The adhesive receiving portion 134a is a rectangular through hole that extends in the leftward/rightward direction from a plan view. The adhesive receiving portion 134a communicates between the interior and the exterior of the casing 13. As described hereafter, the adhesive receiving portion 134a is filled with an adhesive 134b that is used to fix the camera module 11 to the casing 13.

Meanwhile, the lower-portion cover 14 is a member that is provided to close the bottom of the casing 13.

Next, a manufacturing method for the camera apparatus 1 will be described.

First, the camera module 11 is mounted in the mounting position within the casing 13. At this time, the protrusions 114b and 114c on the camera module 11 are inserted into the second through holes 133e and 133f of the casing 13. In addition, the engaging protruding portions 115 and 116 of the camera module 11 are inserted into the first through holes 133b and 133c of the casing 13.

When the engaging protruding portions 115 and 116 are inserted into the first through holes 133b and 133c, the contact surfaces 117a and 118a come into contact with the side surfaces of the through holes 133b and 133c on the exposure hole 133a side and receive external force that works in the direction away from the base portion 114. As a result, the engaging protruding portions 115 and 116 become elastically deformed and the tip end portions thereof spread outward. In this state, the engaging protruding portions 115 and 116 pass through the first through holes 133b and 133c.

When the tip end portions of the engaging protruding portions 115 and 116 pass through the first through holes 133b and 133c, the external force on the tip end portions is no longer applied. The tip end portions are displaced to the base portion 114. Then, the hook portions 117 and 118 in the tip end portions engage with the edge portions of the first through holes 133b and 133c on the front surface side of the casing 13. As a result, movement of the camera module 11 in an arbitrary direction from the mounting position is restrained.

Then, in a state in which the camera module 11 is mounted to the casing 13, the adhesive 134b is applied between the camera module 11 and the casing 13. Specifically, the adhesive receiving portion 134a is filled with the adhesive 134b, and the adhesive 134b is hardened. As a result, the camera module 11 is fixed to the casing 13. According to the present embodiment, an anaerobic adhesive is used as the adhesive 134b. The adhesive 134b is hardened by natural curing. The camera apparatus 1 in which the camera module 11 is fixed to the casing 13 is manufactured in this manner.

[1-2. Effects]

(1a) According to the present embodiment, movement of the camera apparatus 1 from the mounting position within the casing 13 is mechanically restrained. Therefore, when the camera module 11 is fixed to the casing 13 during manufacturing of the camera apparatus 1, the camera module 11 is not necessarily required to be held using a dedicated jig or the like until the adhesive 134b hardens. In addition, limitations on the type of adhesive 134b to be used and the like are relaxed. Therefore, the degree of freedom in the manufacturing process of the camera apparatus 1 can be improved.

(1b) According to the present embodiment, the camera module 11 includes the elastically deformable engaging protruding portions 115 and 116. The casing 13 includes the first through holes 133b and 133c that serve as engaged portions that engage with the engaging protruding portions 115 and 116. In particular, the hook portions 117 and 118 are formed in the tip end portions of the engaging protruding portions 115 and 116. In addition, the engaging protruding portions 115 and 116 are provided so as to protrude in the protruding direction of the lens barrel portion 113. The engaging protruding portions 115 and 116 engage with the edge portions of the first through holes 133b and 133c.

For example, as a restraining portion that restrains movement of the camera module 11 from the mounting position, the following can be considered. That is, a male screw portion (male thread portion) is provided in a portion of the lens barrel portion 113 of the camera module 11 that is exposed from the casing 13. In a state in which the lens barrel portion 113 is exposed from the casing 13, a fastener that screws onto the male screw portion from outside the casing 13 is used. This configuration requires a fastener. Conversely, the configuration according to the present embodiment does not require a fastener. Therefore, compared to the configuration in which the fastener is used, the number of components of the camera apparatus 1 can be reduced.

(1c) According to the present embodiment, the camera apparatus 1 includes the protrusions 114b and 114c, and the second through holes 133e and 133f as the guide portion for guiding the camera module 11 to the mounting position.

Therefore, compared to a configuration in which the guide portion is not provided, mounting of the camera module 11 in the mounting position in a state in which the optical-axis direction of the lenses 112 with respect to the casing 13 is held at the predetermined direction can be facilitated.

(1d) According to the present embodiment, in a state in which the engaging protruding portions 115 and 116 are inserted into the first through holes 133b and 133c, the hook portions 117 and 118 engage with the edge portions of the through holes 133b and 133c on the front side.

For example, in a configuration in which a recessed portion is provided inside the casing 13 as an engaged portion to be engaged with the engaging protruding portion, and the engaging protruding portion is engaged with the recessed portion, the size of the casing, and as a result, the camera apparatus increases by an amount equivalent to the recessed portion. In this regard, in the configuration in which the engaging protruding portions 115 and 116 pass through the first through holes 133b and 133c and engage with the edge portions as according to the present embodiment, the recessed portion is not required to be provided inside the casing 13. Therefore, compared to the foregoing configuration, the size of the camera apparatus 1 can be reduced.

(1e) According to the present embodiment, the adhesive receiving portion 134a, which is a through hole, is provided in the ceiling wall portion 134. The ceiling wall portion 134 is a wall portion of the casing 13 and comes into contact with the camera module 11 in the state in which the camera module 11 is positioned in the mounting position. "Comes into contact with the camera module 11" herein includes not only direct contact between the wall portion and the camera module 11, but also indirect contact between the wall portion and the camera module 11 with another component therebetween.

As a result of the adhesive 134b being applied to the adhesive receiving portion 134a, the camera module 11 is fixed to the casing 13.

Therefore, the camera module 11 can be fixed to the casing 13 as a result of the adhesive 134b being applied to the adhesive receiving portion 134a after the camera module 11 is mounted to the casing 13. In addition, application of the adhesive 134b in a predetermined position can be visually confirmed from outside of the camera apparatus 1 in a state in which the camera apparatus 1 has become a finished product.

According to the present embodiment, the engaging protruding portions 115 and 116 and the first through holes 133b and 133c correspond to the restraining portion. The engaging protruding portions 115 and 116 and the first through holes 113b and 113c correspond to a through hole. The adhesive receiving portion 134a corresponds to an adhesive application through hole.

2. Second Embodiment

[2-1. Differences from the First Embodiment]

A basic configuration according to a second embodiment is similar to that according to the first embodiment. Therefore, description of the common configuration is omitted. Differences will mainly be described.

According to the above-described first embodiment, the engaging protruding portions 115 and 116 of the camera module 11 protrude frontward. In this regard, the second embodiment differs from the first embodiment in that engaging protruding portions 215 and 216, described hereafter, protrude rearward.

Figure 6:
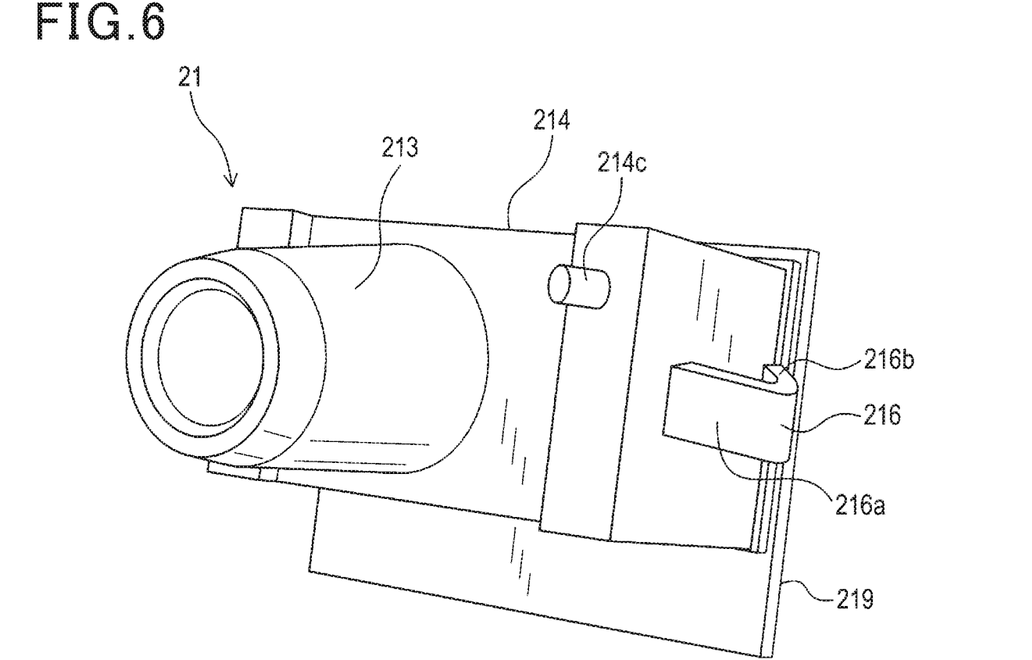
FIG. 6 is a perspective view of a camera module according to a second embodiment, viewed from a front-right direction.
Figure 7:
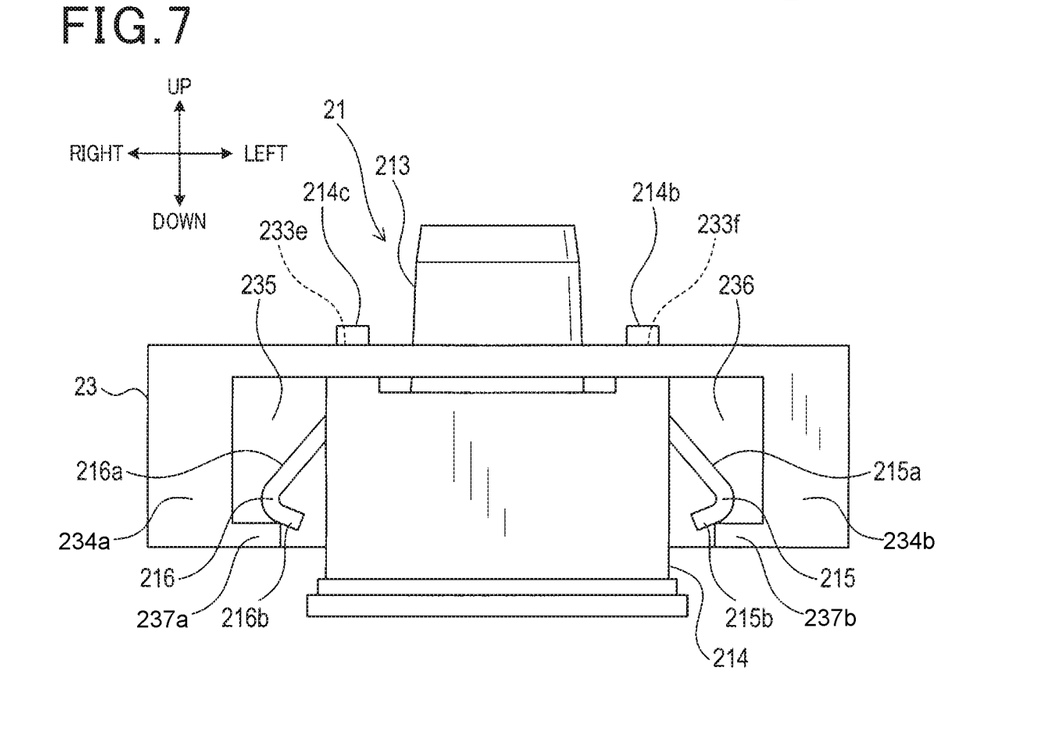
FIG. 7 is an explanatory diagram of a structure of a restraining portion according to the second embodiment.

A camera module 21 according to the second embodiment, shown in FIG. 6 and FIG. 7, is identical to the camera module 11 according to the first embodiment, excluding the structure of the engaging protruding portions. The two elastically deformable engaging protruding portions 215 and 216 are provided on the outer surface of the camera module 21. The engaging protruding portion 215 is provided on a left side surface of a base portion 214 of the camera module 21. The engaging protruding portion 216 is provided on a right side surface of the base portion 214. The engaging protruding portions 215 and 216 and the base portion 214 are integrally molded with resin. In addition, the engaging protruding portions 215 and 216 have the same size and shape.

The engaging protruding portions 215 and 216 protrude in the direction opposite the protruding direction of the lens barrel portion 213, that is, in the rearward direction. Specifically, the engaging protruding portions 215 and 216 protrude obliquely rearward from positions further towards the front than the center on the left and right side surfaces of the base portion 214. In addition, after extending obliquely rearward, the engaging protruding portions 215 and 216 each bend towards the base portion 214 side beyond a bending portion.

Hereafter, the portion of the engaging protruding portion 215 that is further towards the front than the bending portion is referred to as a first extending portion 215a. The portion further towards the rear than the bending portion is referred to as a second extending portion 215b. In a similar manner, the portion of the engaging protruding portion 216 that is further towards the front than the bending portion is referred to as a first extending portion 216a. The portion further towards the rear than the bending portion is referred to as a second extending portion 216b. Outer surfaces of the engaging protruding portions 215 and 216 function as contact surfaces that come into contact with inner wall surfaces of a casing (housing) 23, described hereafter.

Meanwhile, an outer shape of the casing 23 according to the second embodiment is substantially similar to that of the casing 13 according to the first embodiment. However, holes corresponding to the above-described first through holes 133b and 133c are not formed in the casing 23 according to the second embodiment. In addition, an inner structure of the casing 23 according to the second embodiment differs in part from that of the casing 13 according to the first embodiment.

As shown in FIG. 7, the casing 23 includes recessed portions 235 and 236 therein. The recessed portions 235 and 236 are provided on both left and right sides of the mounting position of the camera module 21. Specifically, the casing 23 has inner side walls 234a and 234b therein. The inner side walls are mounted on the perpendicular wall portion 233 and respectively oppose the left and right side surfaces of the base portion 214. In addition, protruding wall portions 237a and 237b that extend in the upward/downward direction are respectively formed in the rear end portions of the inner side walls 234a and 234b. The recessed portions 235 and 236 are formed by the perpendicular wall portion 233, the inner side walls 234a and 234b, and the protruding wall portions 237a and 237b.

Next, a manufacturing method for the camera apparatus according to the second embodiment will be described.

First, the camera module 21 is mounted in the mounting position within the casing 23. When the camera module 21 is mounted, the outer surfaces of the first extending portions 215a and 216a of the engaging protruding portions 215 and 216 come into contact with the protruding wall portions 237a and 237b, and receive external force that works towards the base portion 214 side. As a result, the engaging protruding portions 215 and 216 become elastically deformed, and as a whole, become displaced so as to become closer to the base portion 214.

Then, when the camera module 21 approaches the mounting position and the bending portions of the engaging protruding portions 215 and 216 move beyond the protruding wall portions 237a and 237b, the external force on the first extending portions 215a and 216a is no longer applied. The engaging protruding portions 215 and 216 each become displaced towards the side away from the base portion 214 so as to return to the original position.

In the state in which the first extending portions 215a and 216a are displaced, the bending portions, that is, the portions farthest from the base portion 214 are positioned further outward in the leftward/rightward direction than the tip end portions of the protruding wall portions 237a and 237b. Therefore, movement of the camera module 21 in the rearward direction is restrained. In the state in which the engaging protruding portions 215 and 216 are displaced, the outer surfaces of the second extending portions 215b and 216b are in contact with the protruding wall portions 237a and 237b.

In addition, when the camera module 21 is mounted to the casing 23, protrusions 214b and 214c provided on the front surface of the base portion 214 are inserted into second through holes 233e and 233f. According to the present embodiment, the recessed portions 235 and 236 inside the casing 23 extend in the upward/downward direction.

Therefore, even when the engaging protruding portions 215 and 216 engage with the recessed portions 235 and 236, movement of the camera module 21 in the upward/downward direction is not restrained. Movement of the camera module 21 in an arbitrary direction is not restrained. However, the protrusions 214b and 214c are inserted into the second through holes 233e and 233f. Therefore, movement in the upward/downward direction is restrained in the state in which the camera module 21 is positioned in the mounting position.

That is, according to the present embodiment, movement of the camera module 21 in an arbitrary direction from the mounting position is restrained by the engaging protruding portions 215 and 216 and the recessed portions 235 and 236, as well as by the protrusions 214b and 214c and the second through holes 233e and 233f. The method for fixing the casing 23 and the camera module 21 using an adhesive is similar to that according to the first embodiment. Therefore, a description thereof is omitted.

[2-2. Effects]

According to the second embodiment, described in detail above, effects similar to the above-described effects (1a) to (1c) according to the first embodiment are achieved.

According to the present embodiment, the engaging protruding portions 215 and 216, the recessed portions 235 and 236, the protrusions 214b and 214c, and the second through holes 233e and 233f correspond to a restraining portion.

3. Third Embodiment

[3-1. Differences from the First Embodiment]

A basic configuration according to a third embodiment is similar to that according to the first embodiment. Therefore, description of the common configuration is omitted. Differences will mainly be described.

According to the above-described first embodiment, the movement of the camera module 11 from the mounting position is restrained by the engaging protruding portions 115 and 116 of the camera module 11 engaging with the edge portions of the first through holes 133*b* and 133*c*. In this regard, the third embodiment differs from the first embodiment in that the movement of the camera module from the mounting position is restrained by a fastener being fastened onto a portion of the lens barrel portion of the camera module that is exposed from the casing, from outside the casing.

Figure 8:
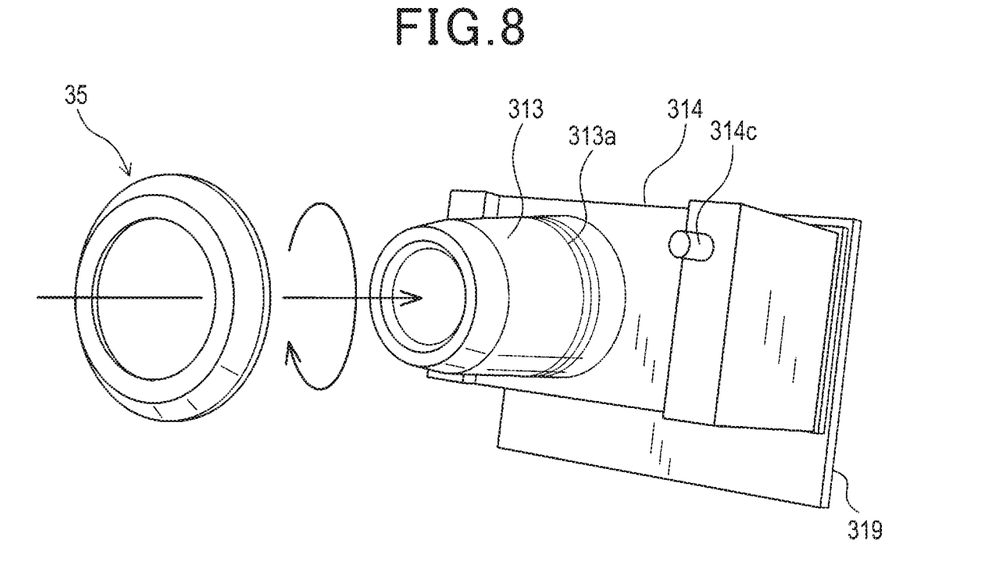
FIG. 8 is a perspective view of a camera module according to a third embodiment, viewed from a front-right direction.
Figure 9:
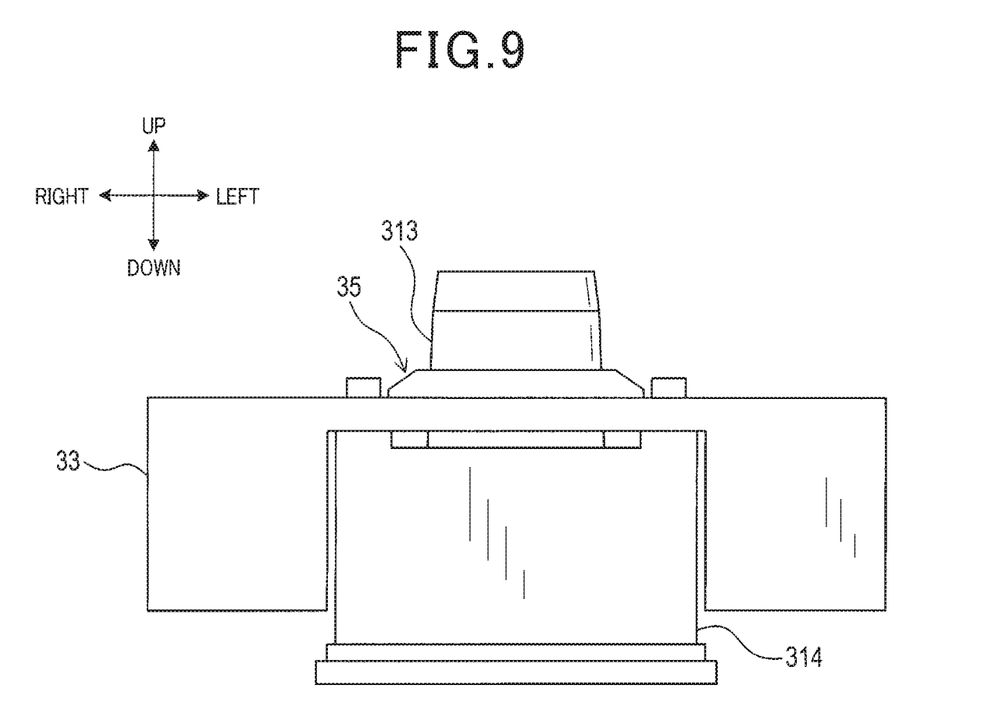
FIG. 9 is an explanatory diagram of a structure of a restraining portion according to the third embodiment.

A camera module 31 according to the third embodiment, shown in FIG. 8 and FIG. 9, has a configuration similar to that of the camera module 11 according to the first embodiment. However, the camera module 31 does not include the engaging protruding portions 115 and 116. Instead, a male screw portion (male thread portion) 313*a* is formed in a lens barrel portion 313 of the camera module 31, along an outer circumference with the axial direction of the lens barrel portion 313 at the center. The male screw portion 313*a* is formed in a portion of the lens barrel portion 313 that is exposed from a casing (housing) 33 in a state in which the camera module 31 is mounted in the mounting position within the casing 33.

The casing 33 according to the third embodiment differs from the casing 13 according to the first embodiment in that the first through holes 133*b* and 133*c* are not provided. Otherwise, the casing 33 basically has a configuration similar to that of the casing 13.

Meanwhile, the camera apparatus according to the third embodiment includes a fastener 35. The fastener 35 is an annular component of which the diameter decreases towards the axial direction of the annular shape. An inner diameter of the fastener 35 matches an outer diameter of the lens barrel portion 313. The lens barrel portion 313 can be inserted into the annular portion of the fastener 35.

In addition, a female screw portion (female thread portion) (not shown) that screws onto the male screw portion 313*a* of the lens barrel portion 313 is formed on the inner surface of the fastener 35.

Next, a manufacturing method for the camera apparatus according to the third embodiment will be described.

First, the lens barrel portion 313 is passed through the exposure hole 133*a*. The camera module 31 is mounted in the mounting position within the casing 33. In this state, the lens barrel portion 313 is inserted through the fastener 35 from outside the casing 33. The fastener 35 is then rotated, and the female screw portion of the fastener 35 and the male screw portion 313*a* of the lens barrel portion 313 are screwed together. As a result, movement of the camera module 31 in an arbitrary direction from the mounting position is restrained. In this state, the camera module 31 is fixed to the casing 33 using an adhesive in a manner similar to that according to the first embodiment. As a result, the camera apparatus is manufactured.

[3-2. Effects]

According to the third embodiment, described in detail above, the following effects are achieved in addition to the above-described effects (1a) and (1c) according to the first embodiment.

According to the present embodiment, the camera apparatus includes the male screw portion 313*a* that is formed in the lens barrel portion 313 and the fastener 35 that has the female screw portion that is screwed onto the male screw portion 313*a*. The movement of the camera module 31 from the mounting position is restrained by the male screw portion 313*a* and the female screw portion being screwed together.

For example, in the camera module 21 according to the second embodiment, the recessed portions 235 and 236 that engage with the engaging protruding portions 215 and 216 are formed inside the casing 23. Therefore, during manufacturing of the casing 33, removing the mold in the downward direction of the casing 33 can be considered. However, in this method, the manufacturing process of the camera apparatus 1 is restrained. In this regard, according to the third embodiment, limitations on the manufacturing process such as this are reduced. Therefore, the degree of freedom in the manufacturing process of the camera apparatus can be improved.

According to the present embodiment, the male screw portion 313*a* of the lens barrel portion 313 and the female screw portion of the fastener 35 correspond to a restraining portion.

4. Fourth Embodiment

[4-1. Differences from the Third Embodiment]

A basic configuration according to a fourth embodiment is similar to that according to the third embodiment. Therefore, description of the common configuration is omitted. Differences will mainly be described.

According to the above-described third embodiment, the lens barrel portion 313 of the camera module 31 and the fastener 35 are screwed together. In this regard, the fourth embodiment differs from the third embodiment in that the lens barrel portion of the camera module and the casing are screwed together.

Figure 10:
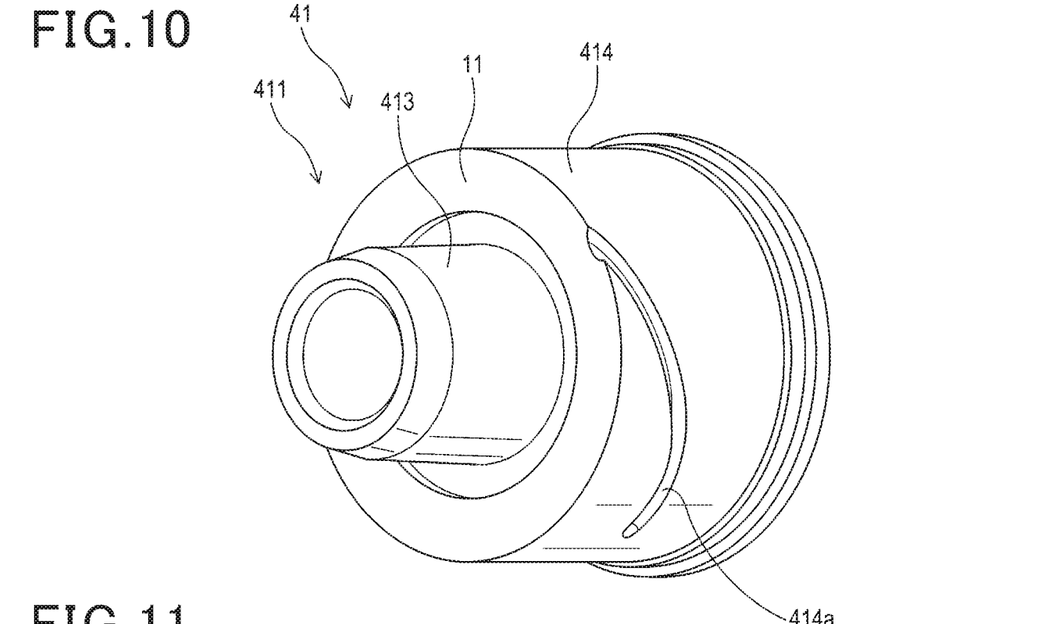
FIG. 10 is a perspective view of a camera module according to a fourth embodiment, viewed from a front-right direction.
Figure 11:
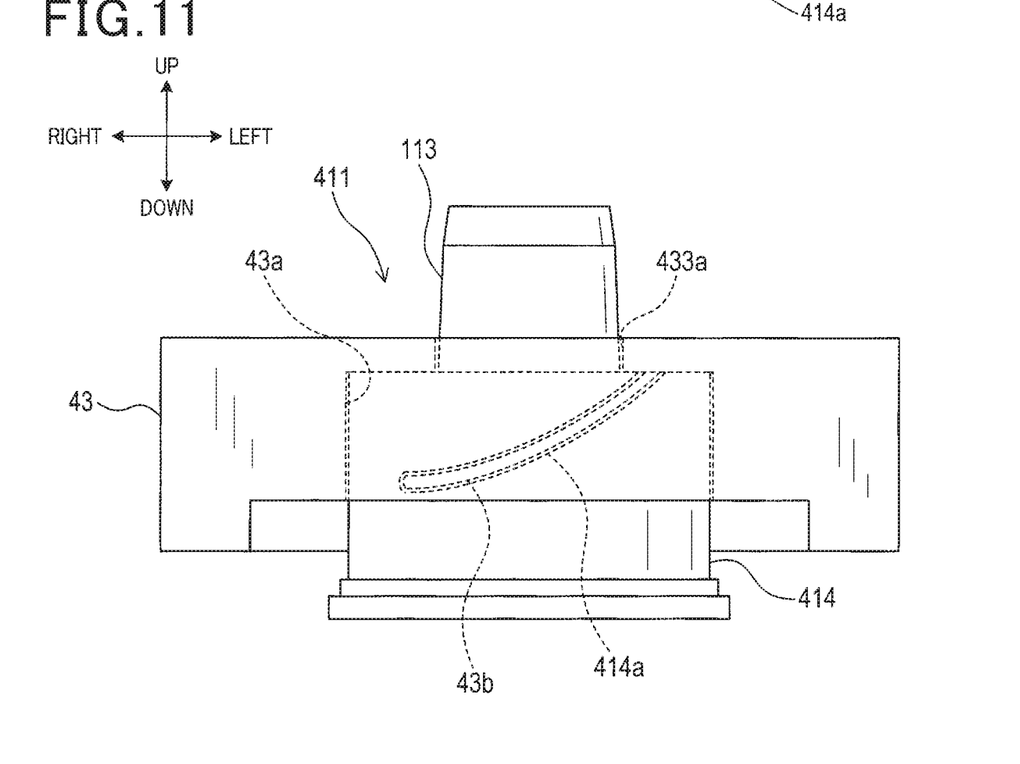
FIG. 11 is an explanatory diagram of a structure of a restraining portion according to the fourth embodiment.

An optical unit 411 of a camera module 41 according to the fourth embodiment shown in FIG. 10 and FIG. 11 include a plurality of lenses (four lenses in this example; not shown), a lens barrel portion 413, and a base portion 414.

The lens barrel portion 413 according to the fourth embodiment has a configuration similar to that of the lens barrel portion 313 according to the third embodiment.

Meanwhile, although the base portion 314 according to the third embodiment is a rectangular parallelepiped, the base portion 414 according to the fourth embodiment is a circular cylinder. Specifically, the base portion 414 has a circular front surface on which the lens barrel portion 413 is mounted. The base portion 414 also has a circular cylindrical side surface that extends in the rearward direction from the outer circumference of the front surface.

In addition, a groove portion 414*a* is formed on the side surface of the base portion 414. The groove portion 414*a* circles the side surface from an end portion of the side surface on the front surface side towards the end portion on the opposite side. That is, a spiral-like groove portion 414*a* is formed. However, the groove portion 414*a* does not make a complete round of the side surface when viewed from the axial direction of the base portion 414, and is formed over a substantially quarter-circular arc. The groove portion 414*a* functions as a male screw portion.

Meanwhile, a circular columnar recess 43*a* into which the base portion 414 is fitted is formed in the frontward/rearward direction inside a casing (housing) 43 according to the fourth embodiment. The recess 43*a* communicates with the exposure hole 33*a*. When the base portion 414 is fitted onto the recess 43*a*, the lens barrel portion 413 is exposed from the exposure hole 433*a*.

In addition, a spiral-like protruding portion 43*b* is formed on a circular cylindrical inner wall surface that forms the recess 43*a* in the casing 43 (that is, an inner wall surface that comes into contact with the side surface of the base portion 414 in a state in which the base portion 414 is fitted into the recess 43*a*). The protruding portion 43*b* is screwed onto the groove portion 414a. The protruding portion 43b is formed into a shape corresponding to the groove portion 414a of the base portion 414.

Specifically, the protruding portion 43b does not completely extend around the inner wall surface that forms the recess 43a, when viewed from the axial direction of the recess 43a. The protruding portion 43b is a substantially quarter-circular arc. The protruding portion 43b functions as a female screw portion.

Next, a manufacturing method for the camera apparatus according to the fourth embodiment will be described.

First, the base portion 414 is fitted into the recess 43a in the casing 43. At this time, the base portion 414 is rotated, and the groove portion 414a of the base portion 414 is engaged with the protruding portion 43b of the casing 43. As a result, movement of the camera module 41 in an arbitrary direction is restrained. In this state, the camera module 41 is fixed to the casing 43 using an adhesive in a manner similar to that according to the first embodiment. As a result, the camera apparatus is manufactured.

[4-2. Effects]

According to the fourth embodiment, described in detail above, the following effects can be achieved in addition to the above-described effects (1a) and (1c) according to the first embodiment and the effects according to the third embodiment.

According to the present embodiment, the groove portion 414a that serves as a male screw portion formed in the base portion 414 and the protruding portion 43b that serves as a female screw portion formed in the casing 43 are screwed together. Therefore, unlike the third embodiment, the fastener 35 is not additionally required for mounting of the camera module. Consequently, compared to the third embodiment, the number of components can be reduced.

According to the present embodiment, the groove portion 414a and the protruding portion 43b correspond to a restraining portion.

5. Other Embodiments

Embodiments for carrying out the present disclosure are described above. However, the present disclosure is not limited to the above-described embodiments. Various modifications are possible.

Figure 12:
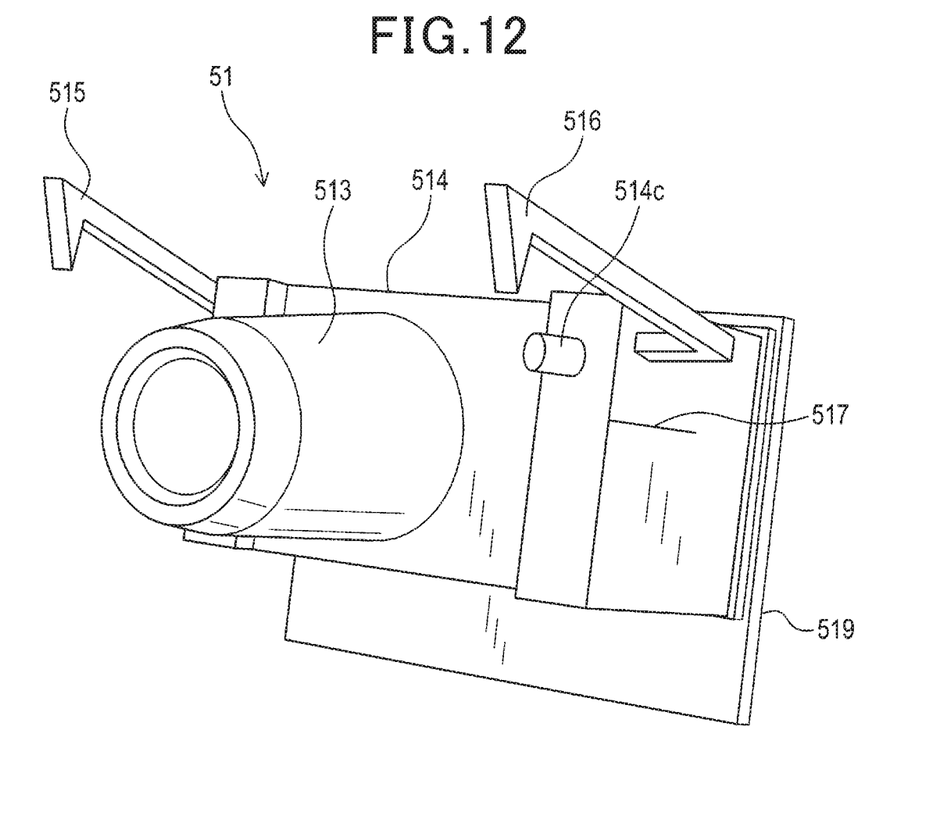
FIG. 12 is a perspective view of a camera module according to another embodiment, viewed from a front-right direction.

(5a) For example, the engaging protruding portions may be configured as shown in FIG. 12. In a camera module 51 shown in FIG. 12, engaging protruding portions 515 and 516 are provided in upper portions of left and right side surfaces of a rectangular parallelepiped-shaped base portion 515. The engaging protruding portions 515 and 516 protrude towards a protruding direction of a lens barrel portion 513 and are tilted upwards relative to the protruding direction.

Although not shown, first through holes that are formed in the casing and through which the engaging protruding portions 515 and 516 are inserted are also formed so as to tilt upwards with respect to the frontward/rearward direction of the casing. That is, in this configuration, the engaging protruding portions 515 and 516 engage with the first through holes in a state in which the engaging protruding portions 515 and 516 are tilted towards the ceiling wall portion side of the casing relative to the protruding direction of the lens barrel portion 513 or the optical-axis direction of the lenses.

As a result of such a configuration, compared to a configuration in which the engaging protruding portions protrude in parallel to the protruding direction of the lens barrel portion as according to the first and second embodiments, the movement of the camera module 51 in two directions, that is, the direction opposite the protruding direction of the lens barrel portion 513 and the direction away from the ceiling wall portion can be more firmly restrained.

Here, an example of a configuration in which the engaging protruding portions 515 and 516 engage with the first through holes in a state in which the engaging protruding portions 515 and 516 are tilted towards the ceiling wall portion relative to the protruding direction of the lens barrel portion 513 is described. However, the side to which the engaging protruding portions are tilted is not limited thereto. The engaging protruding portions may engage with the first through holes in a state in which the engaging protruding portions are tilted to the side opposite the ceiling wall portion relative to the protruding direction of the lens barrel portion.

(5b) The quantities, shapes, formation positions, and the like of the engaging protruding portions, the protrusions that serve as the guide portion, the male screw portion, the groove portion, and the like are not limited to those according to the above-described embodiments.

(5c) The manner of engagement of the engaging protruding portions provided so as to protrude towards the protruding direction of the lens barrel portion is not limited to that according to the above-described first embodiment. For example, recessed portions may be provided inside the casing. Movement of the camera module from the mounting position may be restrained by the engaging protruding portions being engaged with the recessed portions.

(5d) As shown in FIG. 12, notches 517 may be provided in the camera module 51. In the configuration in FIG. 12, the notches 517 are respectively formed in the left and right side surfaces of the base portion 514 in parallel to the optical-axis direction of the lenses. In addition, holding pieces may be provided in the casing in correspondence to the notches 517. The holding pieces are plate-shaped protrusions that can be fitted into the notches 517. When the camera module 51 is mounted in the mounting position within the casing, the plate-shaped holding pieces may be fitted into the notches 517.

As a result of such as configuration, compared to a configuration in which the holding pieces and the notches 517 are not provided and the camera module 51 is mounted to the casing by only the engaging protruding portions 515 and 516, movement of the camera module 51 can be more firmly restrained in the state in which the camera module 51 is mounted in the mounting position.

(5e) For example, according to the above-described first embodiment, the adhesive 134b is applied between the casing 13 and the camera module 11 after the camera module 11 is mounted to the casing 13. However, the timing at which the adhesive 134b is applied is not limited thereto.

For example, the adhesive may be applied in advance to at least either of the camera module and the casing. In this state, the camera module may be mounted to the casing. In addition, for example, in cases in which the camera module is mounted to the casing after application of the adhesive, the adhesive receiving portion need not be a through hole. For example, the adhesive receiving portion may be a recessed portion or the like that is provided inside the casing.

(5f) A plurality of functions provided by a single constituent element according to the above-described embodiments may be actualized by a plurality of constituent elements. A single function provided by a single constituent element may be actualized by a plurality of constituent elements. In addition, a plurality of functions provided by a plurality of constituent elements may be actualized by a single constituent element. A single function provided by a plurality of constituent elements may be actualized by a single constituent element.

Furthermore, a part of a configuration according to the above-described embodiments may be omitted. Moreover, at least a part of a configuration according to an above-described embodiment may be added to or replace a configuration according to another of the above-described embodiments. Any embodiment included in the technical concept specified by the wordings of the scope of claims is an embodiment of the present disclosure.

What is claimed is:

1. A camera apparatus that is mounted to a vehicle, the camera apparatus comprising:
    a camera module that includes:
        a lens;
        a camera board on which an image sensor is provided;
        a lens barrel portion that holds the lens therein; and
        a base portion on which the lens barrel portion is mounted;
    a casing that houses the camera module; and
    a restraining portion that is configured to mechanically restrain movement of the camera module that is mounted in a mounting position within the casing that is predetermined, the restraining portion comprising:
        an engaging portion formed on one of the camera module and the casing; and
        an engaged portion formed on the other of the camera module and the casing, the engaged portion configured to engage the engaging portion to mechanically restrain movement of the camera module relative to the casing in the mounting position within the casing,
    wherein
    the camera module is fixed to the casing by an adhesive,
    the engaging portion is an engaging protruding portion that is provided in the camera module so as to protrude from an outer surface of the camera module and is elastically deformable,
    the engaged portion is provided in the casing and engaged with the engaging protruding portion in a state in which the camera module is positioned in the mounting position,
    the engaging protruding portion is provided so as to protrude towards a protruding direction of the lens barrel portion, and is provided with a hook portion that is formed in a tip end portion thereof,
    the engaged portion is provided on a perpendicular wall portion that is a wall portion of the casing and positioned so as to oppose a front surface of the camera module in a state in which the camera module is positioned in the mounting position, and
    the hook portion engages with the engaged portion.

2. The camera apparatus according to claim 1, wherein:
    the casing has a ceiling wall portion that is positioned above the camera module in a state in which the camera module is positioned in the mounting position; and
    the engaging protruding portion engages with the engaged portion in a state in which the engaging protruding portion is tilted towards a ceiling wall portion side or a side opposite the ceiling wall portion side relative to a protruding direction of the lens barrel portion.

3. The camera apparatus according to claim 1, wherein:
    the engaged portion has a through hole that passes through the perpendicular wall portion in a frontward/rearward direction; and
    the hook portion engages with an edge portion on a front side of the through hole in a state in which the engaging protruding portion is inserted through the through hole.

4. The camera apparatus according to claim 2, wherein:
    the engaged portion has a through hole that passes through the perpendicular wall portion in a frontward/rearward direction; and
    the hook portion engages with an edge portion on a front side of the through hole in a state in which the engaging protruding portion is inserted through the through hole.

5. The camera apparatus according to claim 1, wherein:
    the engaging protruding portion is provided so as to protrude towards a direction opposite the protruding direction of the lens barrel portion, and is engaged with a recessed portion that is provided inside the casing and serves as the engaged portion.

6. The camera apparatus according to claim 1, wherein:
    the engaging portion includes
        a male screw portion that is formed in the lens bar portion or the base portion, and
    the engaged portion includes
        a female screw portion that is screwed onto the male screw portion.

7. The camera apparatus according to claim 1, further comprising:
    a guide portion that guides the camera module to the mounting position in a state in which an optical-axis direction of the lens is held in a predetermined direction with respect to the casing when the camera module is mounted to the casing.

8. A camera apparatus that is mounted to a vehicle, the camera apparatus comprising:
    a camera module that includes:
        a lens;
        a camera board on which an image sensor is provided;
        a lens barrel portion that holds the lens therein; and
        a base portion on which the lens barrel portion is mounted;
    a casing that houses the camera module; and
    a restraining portion that is configured to mechanically restrain movement of the camera module that is mounted in a mounting position within the casing that is predetermined, the restraining portion comprising:
        an engaging portion formed on one of the camera module and the casing; and
        an engaged portion formed on the other of the camera module and the casing, the engaged portion configured to engage the engaging portion to mechanically restrain movement of the camera module relative to the casing in the mounting position within the casing,
    wherein
    the camera module is fixed to the casing by an adhesive,
    the engaging portion is an engaging protruding portion that is provided in the camera module so as to protrude from an outer surface of the camera module,
    the engaged portion is provided in the casing and engaged with the engaging protruding portion in a state in which the camera module is positioned in the mounting position,
    the engaging protruding portion is provided so as to protrude along an optical-axis direction of the lens, and is provided with a hook portion that is formed in a tip end portion thereof,
    the engaged portion is provided on a perpendicular wall portion that is a wall portion of the casing and positioned so as to oppose an outer surface of the camera module in a state in which the camera module is positioned in the mounting position, and the hook portion engages with the engaged portion.

9. The camera apparatus according to claim 2, further comprising:

a guide portion that guides the camera module to the mounting position in a state in which an optical-axis direction of the lens is held in a predetermined direction with respect to the casing when the camera module is mounted to the casing.

10. The camera apparatus according to claim 3, further comprising:

a guide portion that guides the camera module to the mounting position in a state in which an optical-axis direction of the lens is held in a predetermined direction with respect to the casing when the camera module is mounted to the casing.

11. The camera apparatus according to claim 1, further comprising:

an adhesive application through hole that is a through hole provided on a wall portion of the casing that comes into contact with the camera module in a state in which the camera module is positioned in the mounting position, wherein the camera module is fixed to the casing by the adhesive being applied to the adhesive application through hole.

12. The camera apparatus according to claim 8, further comprising:

an adhesive application through hole that is a through hole provided on a wall portion of the casing that comes into contact with the camera module in a state in which the camera module is positioned in the mounting position, wherein the camera module is fixed to the casing by the adhesive being applied to the adhesive application through hole.

13. The camera apparatus according to claim 2, further comprising:

an adhesive application through hole that is a through hole provided on a wall portion of the casing that comes into contact with the camera module in a state in which the camera module is positioned in the mounting position, wherein the camera module is fixed to the casing by the adhesive being applied to the adhesive application through hole.

14. The camera apparatus according to claim 3, further comprising:

an adhesive application through hole that is a through hole provided on a wall portion of the casing that comes into contact with the camera module in a state in which the camera module is positioned in the mounting position, wherein the camera module is fixed to the casing by the adhesive being applied to the adhesive application through hole.

15. A manufacturing method for a camera apparatus that includes a camera module and a casing that houses the camera module, the manufacturing method comprising:

mounting the camera module in a mounting position that is predetermined within the casing, the camera module including:

lens;

a camera board on which an image sensor is provided;

a lens barrel portion that holds the lens therein, and a base portion on which the lens barrel portion is mounted;

restraining movement of the camera module from the mounting position by a restraining portion that is provided in the camera apparatus and mechanically restrains movement of the camera module from the mounting position, the restraining portion comprising:

an engaging portion formed on one of the camera module and the casing; and an engaged portion formed on the other of the camera module and the casing, the engaged portion configured to engage the engaging portion to mechanically restrain movement of the camera module relative to the casing in the mounting position within the casing;

applying an adhesive between the casing and the camera module; and fixing the camera module to the casing by the adhesive being hardened, wherein the engaging portion is an engaging protruding portion that is provided in the camera module so as to protrude from an outer surface of the camera module and is elastically deformable, the engaged portion is provided in the casing and engaged with the engaging protruding portion in a state in which the camera module is positioned in the mounting position, the engaging protruding portion is provided so as to protrude towards a protruding direction of the lens barrel portion, and is provided with a hook portion that is formed in a tip end portion thereof, the engaged portion is provided on a perpendicular wall portion that is a wall portion of the casing and positioned so as to oppose a front surface of the camera module in a state in which the camera module is positioned in the mounting position, and the hook portion engages with the engaged portion.

16. The manufacturing method for a camera apparatus according to claim 15, wherein:

applying the adhesive comprises applying the adhesive between the casing and the camera module in a state in which the camera module is mounted to the casing.

17. The camera apparatus according to claim 8, further comprising:

a guide portion that guides the camera module to the mounting position in a state in which an optical-axis direction of the lens is held in a predetermined direction with respect to the casing when the camera module is mounted to the casing.

* * * * *